United States Patent [19]

Miyazaki et al.

[11] 4,360,826
[45] Nov. 23, 1982

[54] IMAGE PICKUP DEVICE

[76] Inventors: Kenichi Miyazaki, No. 118, Shimokuzawa, Sagamihara-City, Kanagawa-Ken; Tadayoshi Miyoshi, No. 1166, Nishiterao-Cho, Kanagawa-Ku, Yokohama-City, Kanagawa-Ken; Itsuo Takanashi, No. 3-5, Shiomidai, Isogo-Ku, Yokohama-City, Kanagawa-Ken; Shintaro Nakagaki, No. 79, Honmura-Cho, Asahi-Ku, Yokohama-City, Kanagawa-Ken; Koichiro Motoyama, No. 28, Ninomiya, Ninomiya-Machi, Naka-Gun, Kanagawa-Ken; Sumio Yokokawa, No. 162-3, Mitsukyo, Seya-Ku, Yokohama-City, Kanagawa-Ken; Hiroshi Ichimura, No. 1-16-10, Todoroki, Setagaya-Ku, Tokyo, all of Japan

[21] Appl. No.: 230,894

[22] Filed: Feb. 2, 1981

[30] Foreign Application Priority Data

Feb. 4, 1980 [JP] Japan .................. 55-12721[U]

[51] Int. Cl.$^3$ .................................... H04N 9/06
[52] U.S. Cl. ............................ 358/44; 358/46; 315/370; 315/371
[58] Field of Search ............ 358/41, 43, 44, 46, 358/47, 48; 315/14, 17, 368, 370, 371

[56] References Cited

U.S. PATENT DOCUMENTS

| | | | |
|---|---|---|---|
| 3,087,985 | 4/1963 | Heijne | 358/44 |
| 3,875,586 | 4/1975 | Ishibashi | 358/44 |
| 3,939,486 | 2/1976 | Tomii | 358/46 |
| 4,041,528 | 8/1977 | Miyoshi | 358/47 |
| 4,059,840 | 11/1977 | Van De Jolder | 358/44 |

*Primary Examiner*—Tommy P. Chin
*Attorney, Agent, or Firm*—Posnack, Roberts, Cohen & Spiecens

[57] ABSTRACT

An image pickup device comprises an image pickup tube provided with a striped filter which is a repetition of a plurality of stripes, and a pair of collimation forming electrodes which form a collimation, a voltage applying circuit for respectively applying predetermined voltages for forming the above collimation to the pair of collimation forming electrodes of the image pickup tube, and a correction voltage applying circuit for varying the collimation forming voltage ratio by applying a correction voltage to the pair of collimation forming electrodes, where correction voltage has a waveform such that the signal level ratios between the signals of the stripe parts of the striped filter in the color multiplexed signal obtained from the image pickup tube, are substantially constant.

6 Claims, 27 Drawing Figures

FIG. 6
(A) VS — 1V
(B)
(C)
(D) HS — 1H
(E)
(F)
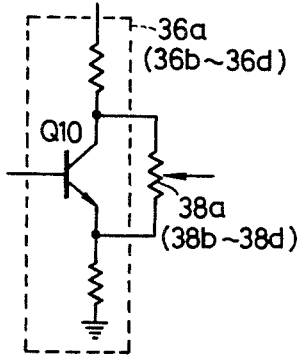
FIG. 7A
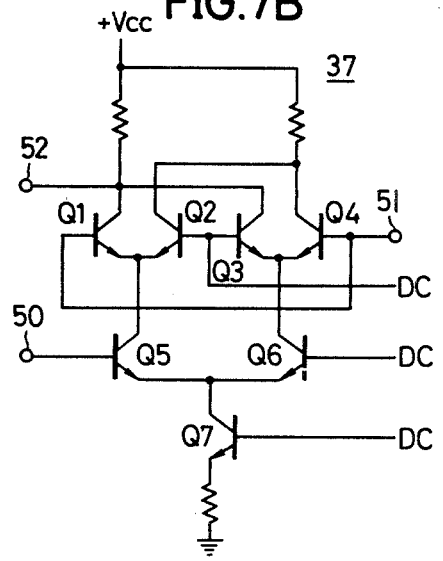
FIG. 7B
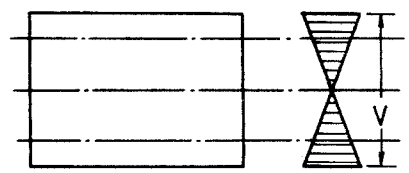
FIG. 8A  FIG. 8B
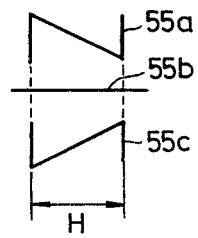
FIG. 8C

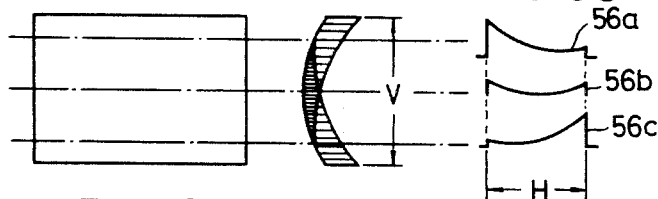
FIG.9A   FIG.9B   FIG.9C
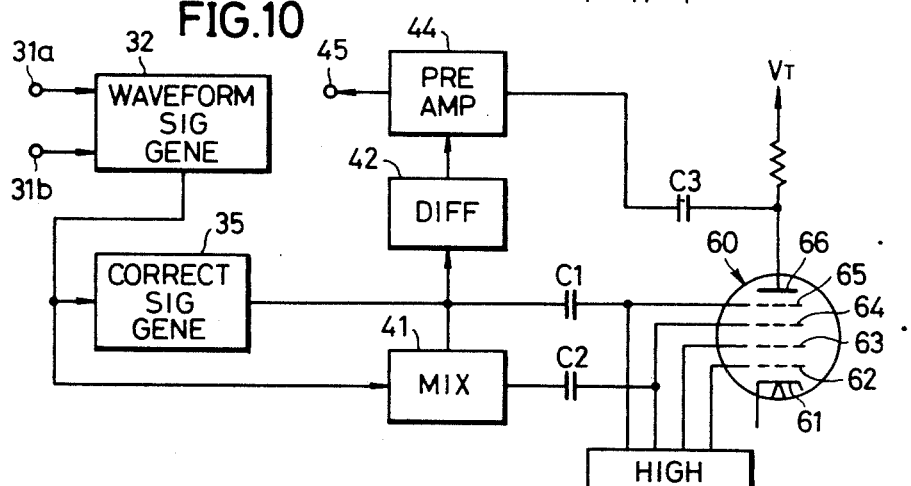
FIG.10
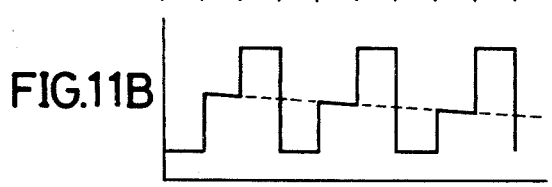
FIG.11A | R | G | B | R | G | B | R | G | B |
FIG.11B
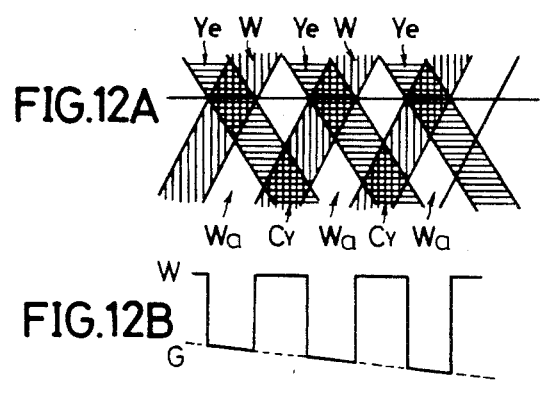
FIG.12A
FIG.12B

IMAGE PICKUP DEVICE

BACKGROUND OF THE INVENTION

The present invention generally relates to image pickup devices, and more particularly to an image pickup device capable of obtaining a fine color multiplexed signal even when irregularities in the pitch, color density, and the like exist in the striped filter. In order to correct the above irregularities, a voltage having a predetermined correction waveform is applied to a grid of an image pickup tube of the image pickup device.

Generally, as compared to a magnetic focus/magnetic deflection type image pickup tube, in an electrostatic focus/magnetic deflection type image pickup tube having a color striped filter, a focus coil on a deflection yoke can be eliminated, and the miniaturization of the image pickup camera is facilitated, hence often being used nowadays. However, the construction of the electrodes in the electrostatic focus type image pickup tube is complex compared to those of the magnetic focus type image pickup tube. Moreover, distortions in the electrodes of the image pickup tube are often introduced in many cases, and in these cases, irregularities are introduced in the color multiplexed signal of the video signal obtained. Accordingly, deleterious effects due to the above distortions in the electrodes were conventionally reduced by dynamic focusing in which the focus of the electron beam is varied according to the scanning position of the electron beam, to constantly obtain fine focusing.

However, in some cases, the color striped filter formed at the target of the image pickup tube has color irregularities and color density irregularities, due to the irregularities in the dye upon forming of the color striped filter, irregularities in the drying speed due to the position of the color striped filter upon drying of the color striped filter, and the like. Furthermore, there are cases in which pitch irregularities are introduced in the color striped filter formed, due to pitch irregularities in the mask for forming the color striped filter. When the above described irregularities in the color density, pitch, and the like exist in the color striped filter, irregularities are introduced in the color multiplexed signal of the video signal, and, as a result, color irregularities are introduced in the picture reproduced on the picture screen of the receiver. Moreover, in many cases, the above color density irregularities are continuously introduced at each filter stripe from the upper to lower end direction (that is, the vertical scanning direction).

The color irregularities due to the above various irregularities in the color striped filter could be reduced by the above dynamic focusing, however, the focus adjustment in the electron beam is rough by use of only the dynamic focusing, and fine adjustment sufficient to improve the color irregularities due to the above irregularities in the color striped filter, cannot be obtained. Accordingly, there was a limit in reducing the above color irregularities by the conventional method, and hence, the color irregularities could not be completely eliminated.

SUMMARY OF THE INVENTION

Accordingly, a general object of the invention is to provide a novel and useful image pickup device in which the above described problems have been overcome.

Another and more specific object of the present invention is to provide an image pickup device constructed to apply a correction signal to the collimation forming electrodes of the image pickup tube, where the waveform of the correction signal is such that it eliminates the irregularities of the color multiplexed signal due to irregularities in the color density, pitch irregularities, and the like of the striped filter provided in the image pickup tube. According to the image pickup device of the present invention, continuous irregularities in the color multiplexed signal which could not be improved by the uniform improvement of the electron beam spot performed by the conventional dynamic focus waveform, can be improved upon, and thus, a high quality video signal can be obtained. Furthermore, the yield upon manufacturing of the above image pickup tube and the striped filter can be improved, hence reducing the total cost.

Still another object of the present invention is to provide an image pickup device in which the above correction signal waveform is of the form where the polarity of a saw-tooth wave and a parabolic wave in the horizontal direction reverses in the vertical scanning direction (within one vertical scanning period). According to the device of the present invention, color irregularities introduced especially in the diagonal direction of the effective scanning surface of the electron beam, can be improved.

BRIEF DESCRIPTION OF THE DRAWINGS

FIGS. 6A through 6F respectively are graphs showing waveforms of signals at each part of the block diagram of FIG. 5;

FIGS. 7A and 7B respectively are circuit diagrams showing concrete circuit embodiments of a bi-polarity signal generation circuit and a special waveform generation circuit;

FIG. 8A is a diagram showing the effective scanning surface of the electronic beam; and FIGS. 8B and 8C respectively are graphs showing the output signal waveform of the special waveform generation circuit of FIG. 6;

FIG. 9A is a diagram showing the effective scanning surface of the electron beam; and FIGS. 9B and 9C respectively are graphs showing the output signal waveform of the compensation waveform generation circuit of the image pickup device of FIG. 5;

FIG. 10 is a systematic block diagram showing another embodiment of an image pickup device according to the present invention;

FIGS. 11A and 11B respectively are an elevation showing another example of a striped filter, and a graph showing the signal waveform accordingly obtained when irregularities exist in the striped filter; and FIGS. 12A and 12B respectively are an elevation showing still another example of a striped filter, and a graph showing the signal waveform accordingly obtained when irregularities exist in the striped filter.

DETAILED DESCRIPTION

Figure 1:
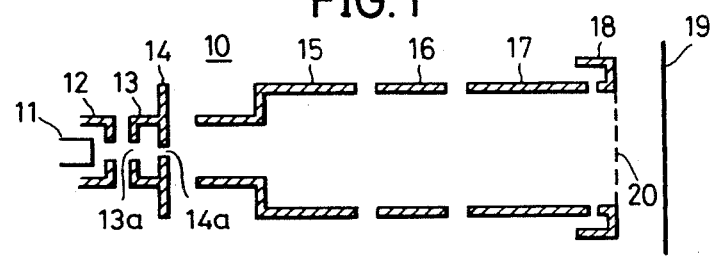
FIG. 1 is a diagram for describing the simplified construction of an electrode structure of an example of a general electrostatic focus type image pickup tube.

Generally, an electrostatic focus magnetic deflection type image pickup tube comprises an electrode structure shown in FIG. 1. An electron beam emitted from a cathode 11 of an image pickup tube 10 is controlled of its beam flow by a first grid 12, and passes through a hole 13a of a second grid 13 which interrupts the high voltage of the grid in the next stage. This electron beam further passes through a beam limiting hole 14a of a beam disc 14 which is of the same electric potential as the second grid 13, and focused on a target 19 so that the spot becomes a minimum spot by use of a main lens formed by a third, fourth, and fifth grids 15, 16, and 17. The electron beam is then focused by collimation electronic lens formed by the fifth grid 17 and a sixth grid 18, controlled so that the focused beam lands on the target 19 vertically, and scans the surface of the target 19. A mesh 20 is provided on the sixth grid 18.

Figure 2A:
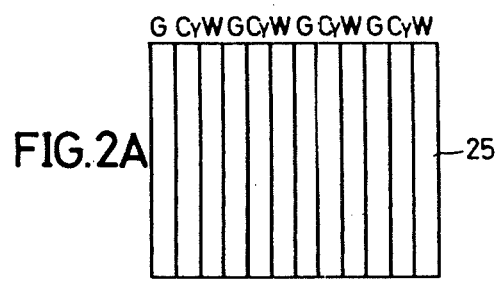
FIG. 2A is an elevation showing an example of a striped filter.

A striped filter 25 which is partly enlarged and shown in FIG. 2A, is formed at the target 19. This striped filter 25 is formed by vaporized laminating metal oxide films, or formed by dyeing the layers of organic matter. In the example shown in FIG. 2A, the striped filter 25 is arranged so that a plurality of groups of striped filters, where each group comprises a green light passing filter stripe G, a cyan light passing filter stripe $C_y$, and a white light passing filter stripe W, are repeatedly arranged extending in a perpendicular direction with respect to the horizontal scanning direction of the electron beam. Moreover, this type of a striped filter, signals obtained from the image pickup tube by use of this type of a striped filter, the processing method for processing the signal thus obtained, and the like, are described in detail in the U.S. Pat. Nos. 4,041,528 and 4,215,364 for example. The output of the image pickup camera tube which uses this striped filter, is a superimposed signal of a direct wave signal containing signals of three primary colors, of additional mixed colors, and a high-band component signal comprising a group of modulated color signals. This output signal of the image pickup tube results from the amplitude modulation of a carrier wave responsive to filter stripes in the color-resolving striped filter. The carrier wave components have a higher harmonic relation relative to two primary color signals.

Figure 2B:
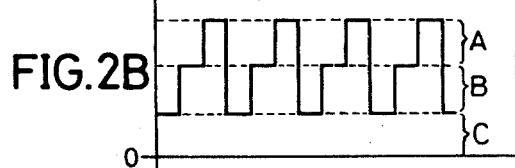
FIGS. 2B, 2D and 2F respectively are graphs showing waveforms of signals corresponding to each filter stripes of the striped filter.
Figure 2C:
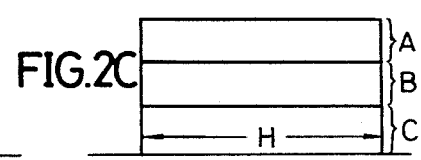
FIGS. 2C, 2E, and 2G respectively are graphs showing waveforms of signals shown in FIGS. 2B, 2D, and 2F when respectively seen from the horizontal scanning line.

When picking up the image of a white light (all-color light) which is uneven throughout the surface, a signal having a waveform shown in FIG. 2B can be obtained from the signal electrode of the target 19, assuming that pitch irregularities, irregularities in the color density, and the like do not exist in each of the filter stripes of the striped filter 25. The signal waveform shown in FIG. 2B correspond to each of the filter stripes G, $C_y$, and W. When considering this output signal level by separating the output signal level into level parts A, B, and C where each of the level parts indicate the level differences between the white signal, cyan light signal, and green light, the ratios between the level parts A, B, and C are all constant on any part of the horizontal line H as shown in FIG. 2C.

Figure 2D:
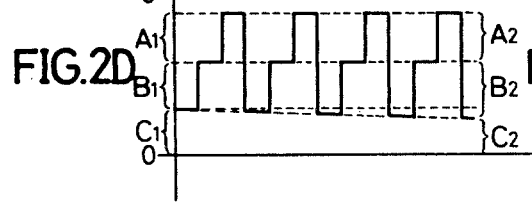
Figure 2E:
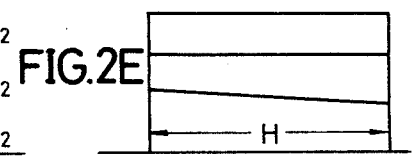

However, when irregularities in the color density exist in the green light passing filter stripe G of the striped filter 25, for example, the irregularities in the color density introduce fluctuations in the green light signal level, and the output signal waveform of the green light passing filter stripe 25 becomes as shown in FIG. 2D. These level fluctuations normally vary continuously. When the above output signal waveform is seen from the direction of the horizontal scanning line H, the signal waveform becomes as shown in FIG. 2E. As clearly seen from the FIGS. 2D and 2E, the above level ratio is A1:B1:C1 at one point in time, but at another point in time, the level ratio becomes A2:B2:C2. Since B1 is smaller than B2, and C1 is larger than C2, A1:B1:C1 is not equal to A2:B2:C2. Accordingly, although an image of a surface which is evenly white throughout was picked up, the output signal of the striped filter 25 has color irregularities.

Figure 2F:
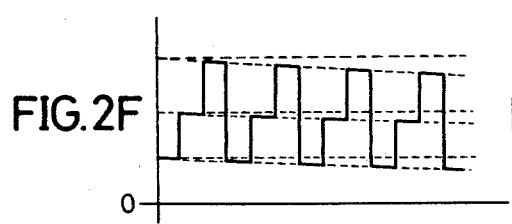
Figure 2G:
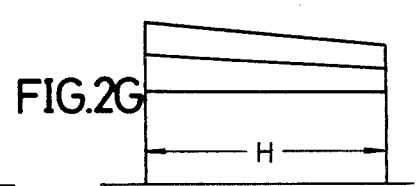

In order to prevent the generation of the color irregularities, the signal level ratio A:B:C obtained relative to each of the filter stripes must be constant at any point in time of the beam scan. Hence, in a case where fluctuations are introduced in the green light signal level due to the irregularities in the green light passing filter stripe as shown in FIG. 2D, for example, the level of the signals obtained relative to the other filter stripes must be varied as shown in FIG. 2F. The output signal waveform obtained when the above procedure is taken, seen from the horizontal scanning direction, becomes as shown in FIG. 2G. Accordingly, the color irregularities can be eliminated by varying the output signal level as shown in FIGS. 2F and 2G. Moreover, luminance irregularities still remain after the above procedure is taken, however, it is known that the effect of the luminance irregularities on the vision of the human eye is much less than that of the color irregularities, and thus, there are no problems concerning this luminance irregularities.

Figure 3:
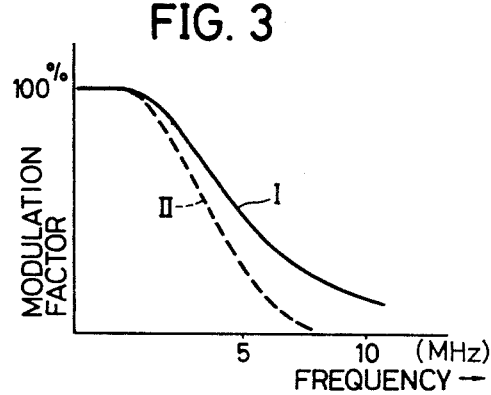
FIG. 3 is a graph showing a frequency versus modulation factor characteristic of the output signal of the image pickup tube, having the cross-sectional shape of the electronic beam at the target surface as a parameter.

On other hand, when the spot shape of the electron beam on the target 19 is a most suitable shape, the frequency versus modulation factor characteristic of the output signal of the image pickup tube 10 becomes as shown by a curve I of FIG. 3. However, when the spot shape of the electron beam on the target 19 is not of a most suitable shape, the frequency versus modulation factor characteristic of the output signal of the image pickup tube 10 becomes as shown by a curve II of FIG. 3. As obvious by comparing these two curves I and II of FIG. 3, the modulation characteristic, especially in the high frequency range, deteriorates, when the spot shape of the electron beam on the target 19 is not of a most suitable shape.

The present invention perceived on the above point, and provides an image pickup device which varies the shape of the electron beam on the target by varying the voltage ratios which form the collimation electronic lens, and varies the output signal level of the image pickup tube, to resultingly prevent the introduction of color irregularities due to irregularities in the striped filter.

Figure 4A:
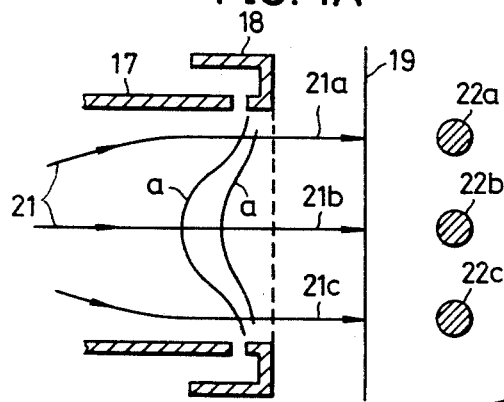
FIGS. 4A, 4B, and 4C respectively are diagrams for explaining the equipotential line at the grid part for forming the collimation electronic lens of the image pickup tube, and the shape of the electron beam on the target surface.
Figure 4B:
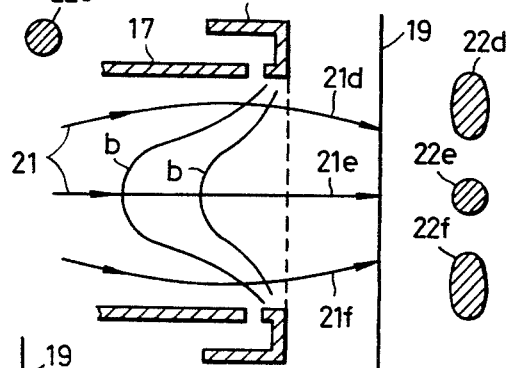
Figure 4C:
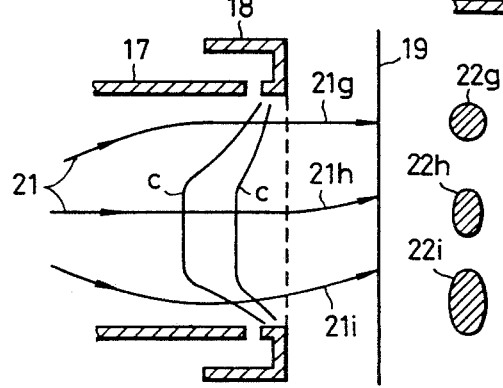

Parts of the fifth and sixth grids 17 and 18, and the target 19 are enlarged and shown in FIGS. 4A, 4B, and 4C. The equipotential line of the collimation electronic lens formed by the fifth and sixth grids 17 and 18 becomes of the form respectively shown by the curves a, b, and c of FIGS. 4A, 4B, and 4C. The ratio $V_2/V_1$ (here $V_2 > V_1$) between a voltage $V_1$ applied to the fifth grid 17, and a voltage $V_2$ applied to the sixth grid 18, is a voltage ratio (collimation ratio) which forms the collimation. When this voltage ratio is set to a small value, an equipotential line is formed having a form shown by the curve a, and when the voltage ratio is set to a large value, an equipotential line is formed having a form shown by the curve b.

In the case where the electron beam focused by the above electronic lens is incident in a direction shown by an arrow 21 from the left-hand-side direction of FIG. 4A, the beam travels in a form respectively shown by the arrows 21a, 21b, and 21c by the collimation electronic lens having an equipotential line shown by the curve a, and lands vertically on the target 19. Spot shapes 22a, 22b, and 22c of the electron beam which lands on the target 19 then, are of circular shapes.

However, when the collimation forming voltage ratio is set to a large value as shown in FIG. 4B, the electron beam travels as shown by arrows 21d through 21f from the collimation electronic lens having the equipotential line b. The electron beam at the peripheral parts land on the target 19 in curved loci, at angles not perpendicular to the target 19 as shown in FIG. 4B. Accordingly, the spot shapes of the electron beam on the target 19 become as shown by the spot shapes 22d through 22f, and the spot shapes 22d through 22f of the electron beam become of oval shapes although the spot shapes 22e of the electron beam at the center is of a circular shape.

Furthermore, when the collimation forming voltage ratio is continuously varied according to the scanning position, the equipotential line continuously vary, and becomes of a form shown by the curve c of FIG. 4C, for example. In this case, the electron beam having a locus shown by the arrow 21g lands on the surface of the target 19 substantially perpendicular to the target surface, the electron beam passing the center lands on the target 19 in a slightly curved locus shown by the arrow 21h, and the electron beam having the locus shown by the arrow 21i lands on the target 19 being largely curved. Therefore, in this case, the beam spots 22g, 22h, and 22i respectively are of substantially circular, oval, and elongated oval shapes.

Hence, since the spot shape of the electron beam on the target 19 varies when the collimation forming voltage ratio is varied, the high-range frequency component level of the output signal of the image pickup tube can be controlled by controlling the collimation forming voltage ratio. Accordingly, the color irregularities due to the pitch irregularities and irregularities in the color density in the filter stripes of the striped filter 25 can be effectively be corrected, by controlling the collimation forming voltage ratio.

Especially when an image pickup tube output signal of the form shown in FIGS. 2D and 2E is obtained, the high frequency range components can be continuously reduced upon horizontal scanning. Therefore, the spot shape of the electron beam on the target 19 is varied from an oval shape into a circular shape as shown in FIG. 4C, by continuously varying the collimation forming voltage ratio upon horizontal scanning.

Figure 5:
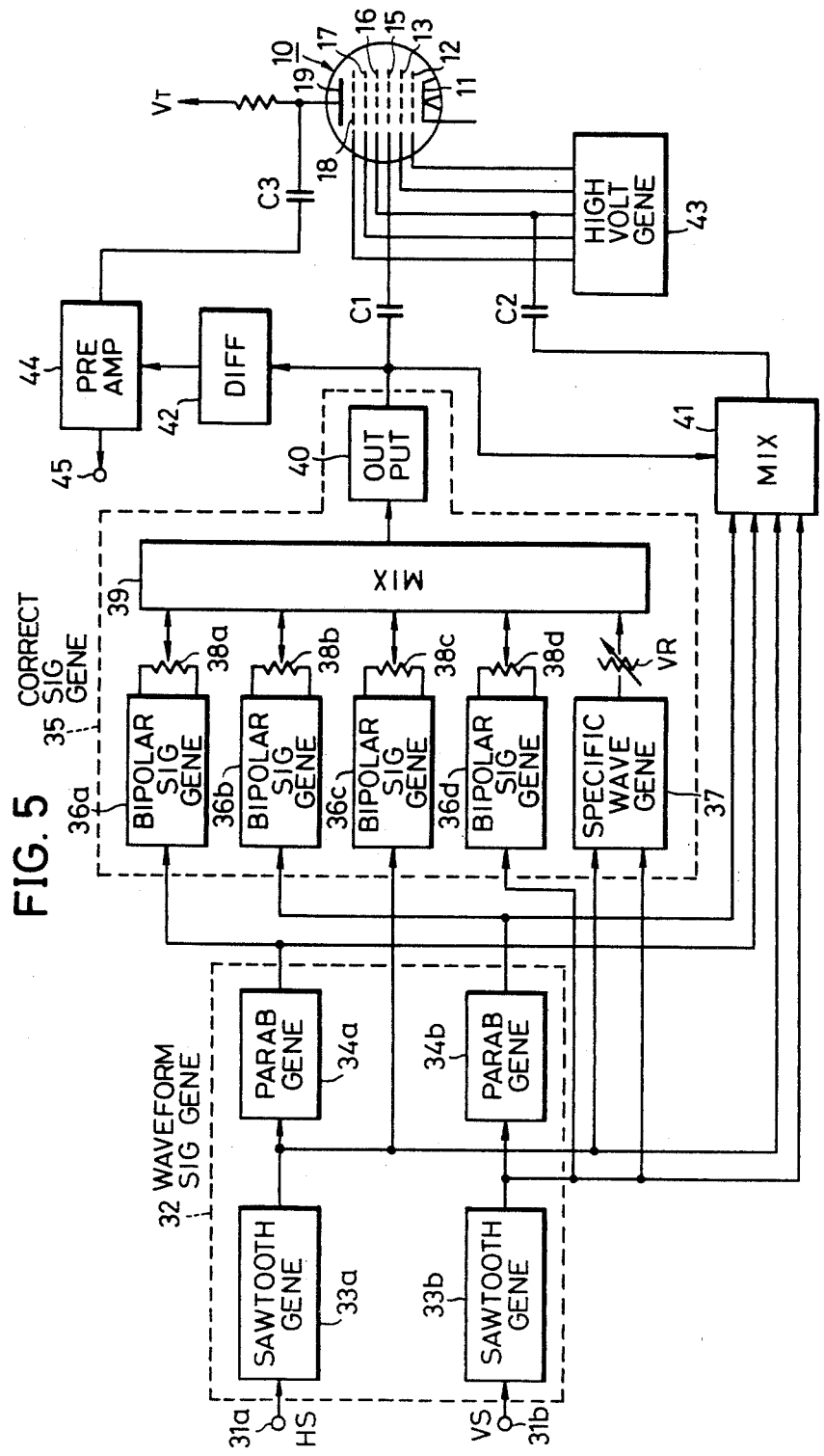
FIG. 5 is a systematic block diagram showing an embodiment of an image pickup device according to the present invention.

An embodiment of a block system of an image pickup device according to the present invention uses the above concept, will now be described in conjunction with FIG. 5.

A vertical synchronizing pulse VS of one vertical scanning period (1V) shown in FIG. 6(A) and a horizontal synchronizing pulse HS of one horizontal scanning period (1H) shown in FIG. 6(D) of the television camera, are respectively supplied to saw-tooth wave generating circuits 33a and 33b within a waveform generating circuit 32, from input terminals 31a and 31b. In FIGS. 6(D) through 6(F), the graphs are shown with the horizontal-axis enlarged (elongated) compared to those of FIGS. 6(A) through 6(C). The saw-tooth wave generating circuits 33a and 33b respectively form saw-tooth waves shown in FIGS. 6(B) and 6(E) by integrating the input synchronizing pulses. The output saw-tooth waves of the saw-tooth wave generating circuits 33a and 33b are respectively supplied to parabolic wave generating circuits 34a and 34b, wherein the waves thus supplied are integrated and converted into parabolic waves shown in FIGS. 6(C) and 6(F). Moreover, triangular wave generating circuits can be used instead of the saw-tooth wave generating circuits 33a and 33b.

The output parabolic waves of the above parabolic wave generating circuits 34a and 34b are respectively supplied to bi-polarity signal generating circuits 36a and 36b of a compensation signal generating circuit 35, and the output saw-tooth wave of the above saw-tooth wave generating circuits 33a and 33b are respectively supplied to bi-polarity signal generating circuits 36c and 36d. The bi-polarity signal generating circuits 36a (36b, 36c and 36d) comprises a transistor Q10, for example, as shown in FIG. 7A, and a variable resistor 38a (38b, 38c, and 38d) is connected between the emitter and the collector of the transistor Q10. A signal waveform having the same polarity as that applied to the base is obtained from the emitter of the transistor Q10, and a signal waveform having an opposite polarity as that applied to the base is obtained from the collector of the transistor Q10. Accordingly, by suitably adjusting the position of the sliders in the variable resistors 38a through 38d, signals are obtained as a result of combining the bi-polarity signals at suitable levels, and the signals thus obtained are supplied to a mixer 39.

On the other hand, the output signals of the saw-tooth wave generating circuits 33a and 33b are respectively supplied to the specific waveform generating circuit 37, wherein the waveform thus supplied are converted into a waveform which continuously varies so that the polarity of the saw-tooth wave of every horizontal scanning period 1H reverses within the vertical scanning period 1V. The output signal of the specific waveform generating circuit 37 is then supplied to the mixer 39 through a variable resistor VR. The specific waveform generating circuit 37, for example, has a circuit construction shown in FIG. 7B. NPN-transistors Q1 through Q7 construct a general double balanced connection differential amplifier circuit, and the emitters of the transistors Q1 and Q2 are both connected to the collector of the transistor Q5. The emitters of the transistors Q3 and Q4 are both connected to the collector of the transistor Q6, and further, the emitters of the transistors Q5 and Q6 are both connected to the collector of the transistor Q7. A predetermined DC voltage is applied to the bases of the transistors Q2, Q3, Q6, and Q7, and a saw-tooth wave of one vertical scanning period is respectively supplied to the bases of the transistors Q1 and Q4 from the saw-tooth wave generating circuit 33b through an input terminal 51. A saw-tooth wave of one horizontal scanning period is supplied to the base of the transistor Q5 from the saw-tooth wave generating circuit 33a through an input terminal 50.

The output signal waveforms obtained from the collectors of the transistors Q1 and Q3 through the output terminal 52 become of the form shown in FIGS. 8B and 8C. A saw-tooth wave inclined on the right hand side as shown by a numeral 55a in FIG. 8C, is repeatedly provided as output every one horizontal scanning period from the uppermost part to the central part of the electron beam effective scanning surface on the target shown in FIG. 8A. The envelope of the above output signal undergoes gradual reduction as shown in FIG. 8B, and becomes of zero level at the central part of the effective scanning surface as shown by a numeral 55b in FIG. 8C. Furthermore, a saw-tooth wave inclined on the left hand side as shown by a numeral 55c in FIG. 8C, is repeatedly provided as output every one horizontal scanning period 1H from the central part to the lowermost part of the effective scanning surface. The envelope of this output signal undergoes gradual increase as shown by the signal waveform of FIG. 8B. Accordingly, the polarity of the saw-tooth wave in the horizontal direction reverses within the vertical scanning period 1V.

It is known from experiments that the specific waveform obtained from the output terminal 52 is especially effective as a compensation waveform in the diagonal direction of the effective scanning surface of the electron beam. Further, this specific waveform can of course be used effectively as a dynamic focus waveform.

The signals supplied through the variable resistors 38a through 38d, and VR are mixed at the mixer 39, and correction waveforms of the forms shown in FIGS. 9B and 9C are thus obtained. A signal shown by a numeral 56a of FIG. 9C is repeated every one horizontal scanning period 1H from the uppermost part of the central part of the electron beam effective scanning surface shown in FIG. 9A, and the envelope of the above signal gradually decreases as shown in FIG. 9B within one vertical scanning period 1V. Furthermore, at the central part to the lowermost part of the effective scanning surface, a signal shown by a numeral 56c is repeated every one horizontal scanning period 1H, and the envelope of this signal gradually increases as shown in FIG. 9B.

The output correction signal of the mixer 39 is supplied to a differentiating circuit 42 and a mixer 41 through an output circuit 40, and also applied to the third and fifth grids 15 and 17 of the electrostatic focus magnetic deflection type image pickup tube 10 through a capacitor C1.

A DC voltage $V_T$ is applied to the target (anode) 19 of the image pickup tube 10, a blanking signal is applied to the cathode 11, and a high DC voltage from a high DC voltage generating circuit 43 is applied to the first through sixth grids 12 through 18.

Of the fifth and sixth grids 17 and 18 which form the above collimation, the sixth grid 18 is only applied with a constant DC voltage $V_2$. On the other hand, a correction signal having a waveform shown in FIGS. 9B and 9C is applied to the fifth grid 17 through the capacitor C1. Accordingly, the collimation forming voltage ratio varies according to the correction signal waveform, and the spot shape of the electron beam on the target 19 is accordingly varied. Hence, the non-uniformity of the color multiplexed signal due to the pitch irregularities, irregularities in the color density, and the like in the above striped filter is improved.

Furthermore, the focusing point of the electron beam generally exist in a spherical manner, but the target surface is flat, and thus, conventionally, a method called "dynamic focusing" is used so that the focusing state can be maintained throughout the whole target surface. This is a method in which the output of the mixer 39 of FIG. 5 is applied to the fourth grid 15 as it is. The dynamic focusing is also used in the present invention, however, as stated above, during the period in which the correction signal voltage is applied to the third and fifth grids 15 and 17, the condition of the main lens formed by the third through fifth grids 15 through 17 varies.

Therefore, in the device of the present invention, the correction signal from the correction signal generating circuit 35 is mixed with the signal from the waveform signal generating circuit 32, at the mixer 41. The output signal of the mixer 41 is applied to the fourth grid 16 through a capacitor C2.

The video signal obtained from the target (anode) 19 of the image pickup tube 10 is supplied to a preamplifier 44 through a coupling capacitor C3, and added with a signal from the differentiating circuit 42. When the above correction signal voltage is applied to the fifth grid 17, the above correction signal is differentiated and this differentiated signal mixes into the output signal of the target 19 as unwanted signal, due to the stray capacitance between the fifth and sixth grids 17 and 18 and between the sixth grid 18 and the target 19. Accordingly, in this embodiment, the differentiating circuit 42 is constructed so that it has the same time constant as that of the differentiating circuit formed by the stray capacitance between the electrodes and the negative resistance of the image pickup tube 10. Moreover, the differentiated signal from the differentiating circuit 42 having a polarity which eliminates the differentiated signal which is mixed into the above output video signal, is supplied to the preamplifier 44.

Thus, a clear output video signal having eliminated the unwanted signal component due to the stray capacitance between the electrodes of the image pickup tube 10, can be obtained from an output terminal 45.

In the above embodiment, the voltage $V_2$ of the sixth grid 18 which forms the collimation is held constant, and the grid voltage $V_1$ is varied by applying the correction signal voltage to the fifth grid 17, but instead, the fifth grid voltage $V_1$ can be held constant and the voltage $V_2$ of the sixth grid 18 varied.

The image pickup tube is not limited to the electrostatic focus magnetic deflection type, and can be of a magnetic focus magnetic deflection type as shown in the embodiment of FIG. 10. In FIG. 10, those parts which are the same as those corresponding parts in FIG. 5 are designated by the like reference numerals, and their description will be omitted.

A magnetic focus magnetic deflection type image pickup tube 60 comprises a cathode 61, a first, second, third, and fourth grids 62, 63, 64, and 65, and a target (anode) 66. The third grid 64 also functions as a focusing electrode. The voltage ratio between the third and fourth grids 64 and 65, is the voltage ratio which forms the collimation. The correction signal voltage from the correction signal generating circuit 35, is applied to a fourth grid 65 which forms the collimation and does not function as a focusing electrode, through the capacitor C1. The output signal from the mixer 41 is applied to the third grid 64 through the capacitor C2.

Furthermore, in the device according to the present invention, the collimation forming voltage ratio is varied according to the scanning position of the electron beam, and hence, the electron gun can be a bi-potential type, unipotential type, or tri-potential type.

Moreover, since the device of the present invention improves on the non-uniformity of the color multiplexed signal by controlling the diameter of the electron beam, the striped filter is not limited to that shown in FIG. 2A, and can be a striped filter in which predetermined filter stripe groups are repeatedly arranged.

In a phase separation type color television camera using a striped filter 70 which is formed from repetition of groups wherein the group comprises a red light passing part R, a green light passing part G, and a blue light passing part B, as shown in FIG. 11A, for example, the output signal of the image pickup tube upon picking up of an image which is uniformly of cyan color throughout, becomes as shown in FIG. 11B when irregularities in the density of the dye exist in the green light passing part G, and the ratio relationship between the output levels of each of the image pickup tubes of the parts R, G, and B becomes irregular.

In addition, in a frequency separation type color television camera using a striped filter which is formed from two repetitive groups crossing each other in the diagonal direction of the scanning line as shown by the arrow of FIG. 12A, wherein one group comprises a yellow light passing part Ye and a white light passing part W, and the other group comprises a white light passing part Wa and a cyan light passing part Cy, when irregularities in the density of the yellow light passing part Ye of the above striped filter, the level ratio becomes irregular even upon image pickup of a white light uniform throughout, and the output signal of the image pickup tube becomes of the form shown in FIG. 12B, for example. This crossing type striped filter is also a repetition of a complementary color and a transparency, and therefore, it can be easily assumed that the non-uniformity in the output signal of the image pickup tube can be improved by varying the above collimation forming voltage ratio.

Furthermore, the above description is concerned with improving the color irregularities in the horizontal direction, however, the present invention fundamentally involves the varying of the collimation forming voltage ratio, and thus, similar improved effects can be obtained by varying the collimation forming voltage ratio in the vertical direction within the effective scanning surface, and further, the two can be combined.

Further, this invention is not limited to these embodiments but various variations and modifications may be made without departing from the scope of the invention.

What is claimed is:

1. An image pickup device capable of obtaining a color multiplexed signal comprising:
    an image pickup tube provided with a striped filter which is a repetition of a plurality of stripes, and a pair of collimation forming electrodes which form a collimation;
    voltage applying means for respectively applying predetermined voltages for forming said collimation to said pair of collimation forming electrodes of said image pickup tube, said collimation being formed responsive to a voltage ratio of said voltages applied to each of said collimation forming electrodes; and
    correction voltage applying means for varying the collimation forming voltage ratio by applying a correction voltage to one of said pair of collimation forming electrodes, said correction voltage having a waveform such that the signal level ratios between the signals of the stripe parts of the striped filter in the color multiplexed signal obtained from said image pickup tube, are substantially constant.

2. A device as claimed in claim 1 in which said correction voltage is a combined waveform of a saw-tooth wave and a parabolic wave respectively of the horizontal scanning period and the vertical blanking period.

3. A device as claimed in claim 1 in which said correction voltage is a saw-tooth wave of the horizontal scanning period which reverses polarity within the vertical scanning period.

4. A device as claimed in claim 1 in which said correction voltage applying means has a first saw-tooth wave generating circuit for generating a saw-tooth wave respective of the horizontal synchronizing signal, a second saw-tooth wave generating circuit for generating a saw-tooth wave respective of the vertical synchronizing signal, a first parabolic wave generating circuit for generating a parabolic wave respective of the output signal of said first saw-tooth wave generating circuit, a second parabolic wave generating circuit for generating a parabolic wave respective of the output signal of said second saw-tooth wave generating circuit, polarity and level circuit for respectively obtaining the output signals of said first and second saw-tooth wave generating circuits and the outputs of said first and second parabolic wave generating circuits at suitable polarities and levels, a circuit for generating a waveform which reverses polarity within the vertical scanning period from said first and second saw-tooth wave generating circuits, and a first mixer for mixing the output signal of said polarity and level circuit and the output of said circuit for generating a waveform which reverses polarity to provide said correction voltage.

5. A device as claimed in claim 4 in which said polarity and level circuit has a bi-polarity signal generating circuit for respectively generating a signal having positive polarity and reverse polarity from the signal supplied thereto, and a variable resistor having its terminals respectively connected with the positive polarity signal output terminal and the reverse polarity signal output terminal of said bi-polarity signal generating circuit, for obtaining a suitably mixed signal from the slider of said variable resistor by the bi-polarity signal.

6. A device as claimed in claim 4 in which said image pickup tube further has two electrodes which form a main lens together with one electrode of said pair of collimation forming electrodes, said first mixer applying its output to said one electrode of said pair of collimation forming electrodes and also to one of said two lens which form a main lens, and a second mixer for mixing the output of said first mixer and the outputs of said first and second saw-tooth wave generating circuits and said first and second parabolic wave generating circuits, said second mixer applying its output to the other electrode of said two electrodes which form a main lens by a predetermined ratio with respect to the voltage applied to said one electrode of said pair of collimation forming electrodes.

* * * * *

UNITED STATES PATENT AND TRADEMARK OFFICE
CERTIFICATE OF CORRECTION

PATENT NO. : 4,360,826
DATED : November 23, 1982
INVENTOR(S) : Kenichi Miyazaki et al.

It is certified that error appears in the above-identified patent and that said Letters Patent is hereby corrected as shown below:

On the title page insert -- /73/ Assignee: Victor Company of Japan, Ltd., Yokohama, Japan --.

Signed and Sealed this

Twenty-ninth Day of January 1985

[SEAL]

Attest:

DONALD J. QUIGG

*Attesting Officer*  *Acting Commissioner of Patents and Trademarks*